US012569969B2

(12) United States Patent
Witzigreuter et al.

(10) Patent No.: US 12,569,969 B2
(45) Date of Patent: Mar. 10, 2026

(54) IMPACTING APPARATUS

(71) Applicant: Tricord Solutions, Inc., Brentwood, TN (US)

(72) Inventors: John Witzigreuter, Canton, GA (US); Christopher Pedicini, Brentwood, TN (US)

(73) Assignee: Tricord Solutions, Inc., Brentwood, TN (US)

(*) Notice: Subject to any disclaimer, the term of this patent is extended or adjusted under 35 U.S.C. 154(b) by 0 days.

(21) Appl. No.: 18/648,451

(22) Filed: Apr. 28, 2024

(65) Prior Publication Data

US 2024/0408734 A1 Dec. 12, 2024

Related U.S. Application Data

(60) Provisional application No. 63/507,048, filed on Jun. 8, 2023.

(51) Int. Cl.
*B25D 11/10* (2006.01)
*B25D 9/04* (2006.01)

(52) U.S. Cl.
CPC ................ *B25D 11/10* (2013.01); *B25D 9/04* (2013.01); *B25D 2211/062* (2013.01); *B25D 2250/375* (2013.01)

(58) Field of Classification Search
CPC .... B25D 9/04; B25D 11/10; B25D 2211/062; B25D 2250/375; B25C 3/00; E02D 7/10; E02D 7/12
See application file for complete search history.

(56) References Cited

U.S. PATENT DOCUMENTS 1,731,576 A * 10/1929 Jackson .................... E21D 3/00 173/51
1,800,397 A * 4/1931 Mueller .................... E02D 7/10 173/133
2,094,185 A * 9/1937 Norling ................ B25D 11/106 173/205
2,599,995 A * 6/1952 Hobson ................. E04H 17/263 173/124

(Continued)

FOREIGN PATENT DOCUMENTS

EP 1980671 A2 * 10/2008 ............. E01C 19/38
JP 2020131407 A * 8/2020 ............... B25C 1/06

*Primary Examiner* — Stephen F. Gerrity
*Assistant Examiner* — David G Shutty
(74) *Attorney, Agent, or Firm* — Jay Schloff; Aidenbaum Schloff and Bloom PLLC

(57) ABSTRACT

An impacting apparatus comprises a motor to actuate a spring striker assembly that includes a gas spring piston that is coupled to a striker. After a sufficient movement of the piston, the piston commences movement and accelerates the spring striker assembly to impact a substrate or object. The motor is coupled to the spring striker assembly through an interrupted drive mechanism such as a chain and sprockets configuration for providing for continuous impacting/driving. The drive mechanism alternatively actuates the piston of the spring striker assembly and decouples from the spring striker assembly to allow pressure or other force to act on the spring piston. The gas spring is replaceable and becomes slightly energized when installed in the apparatus by a gas spring preload means.

17 Claims, 19 Drawing Sheets

(56) References Cited

U.S. PATENT DOCUMENTS

| | | | | | |
|---|---|---|---|---|---|
| 2,710,963 | A * | 6/1955 | Francis | B25C 1/005 | 227/131 |
| 3,205,952 | A * | 9/1965 | Sicotte | E02D 7/04 | 173/132 |
| 3,369,616 | A * | 2/1968 | Mcgonigal | E04H 17/263 | 173/124 |
| 3,448,817 | A * | 6/1969 | Kawata | B25D 11/108 | 173/DIG. 3 |
| 3,566,668 | A * | 3/1971 | Browning et al. | G01N 3/32 | 73/82 |
| 3,700,047 | A * | 10/1972 | Gartner | E04H 17/263 | 173/124 |
| 4,018,135 | A * | 4/1977 | Lance | B25D 9/20 | 91/321 |
| 4,050,526 | A * | 9/1977 | Deike | E21B 7/028 | 173/147 |
| 4,215,808 | A * | 8/1980 | Sollberger | B25C 1/041 | 227/132 |
| 4,405,020 | A * | 9/1983 | Rassieur | E02D 7/08 | 173/124 |
| 4,648,609 | A * | 3/1987 | Deike | B25D 17/082 | 267/155 |
| 5,012,873 | A * | 5/1991 | Kennedy | E01F 9/619 | 173/53 |
| 5,129,383 | A * | 7/1992 | Rutten | F41A 7/06 | 124/66 |
| 5,291,955 | A * | 3/1994 | Clark | B25D 17/32 | 173/24 |
| 5,816,741 | A * | 10/1998 | Troppman, III | E01C 19/283 | 404/127 |
| 6,003,619 | A * | 12/1999 | Lange | E21B 1/02 | 173/132 |
| 7,237,706 | B2 * | 7/2007 | Vought | E01C 23/124 | 227/62 |
| 7,331,405 | B2 * | 2/2008 | Robson | B28D 1/26 | 173/147 |
| 7,578,420 | B2 * | 8/2009 | Tanimoto | B25C 1/06 | 227/132 |
| 7,870,832 | B2 * | 1/2011 | Cotter | G01L 19/12 | 116/266 |
| 8,505,798 | B2 * | 8/2013 | Simonelli | B25F 5/02 | 227/126 |
| 9,539,714 | B1 * | 1/2017 | Pedicini | B25C 1/06 | |
| 9,555,530 | B2 * | 1/2017 | Pedicini | B25C 5/15 | |
| 9,662,777 | B2 * | 5/2017 | Pomeroy | B25C 1/041 | |
| 9,677,340 | B1 * | 6/2017 | Gochis | E21B 7/02 | |
| 10,342,591 | B2 * | 7/2019 | Pedicini | B25D 11/068 | |
| 10,407,860 | B2 * | 9/2019 | Jinnings | B25D 9/06 | |
| 10,625,407 | B2 * | 4/2020 | Sato | B25C 1/06 | |
| 10,632,601 | B2 * | 4/2020 | Pomeroy | B25C 1/047 | |
| 10,695,899 | B2 * | 6/2020 | Scott | B25C 1/041 | |
| 10,751,865 | B2 * | 8/2020 | Pedicini | B25C 1/047 | |
| 10,759,029 | B2 * | 9/2020 | Schnell | B25C 1/044 | |
| 10,912,597 | B2 * | 2/2021 | Pedicini | A61F 2/461 | |
| 10,946,504 | B1 * | 3/2021 | Pedicini | B25C 1/047 | |
| 11,033,315 | B2 * | 6/2021 | Pedicini | B25D 11/108 | |
| 11,076,903 | B2 * | 8/2021 | Pedicini | A61B 17/92 | |
| 11,083,512 | B2 * | 8/2021 | Pedicini | A61B 17/92 | |
| 11,243,045 | B2 * | 2/2022 | Witzigreuter | F41B 11/643 | |
| 11,292,114 | B2 * | 4/2022 | Pedicini | B25C 1/047 | |
| 11,400,574 | B2 * | 8/2022 | Namouz | B25C 1/008 | |
| 2006/0180631 | A1 * | 8/2006 | Pedicini | B25C 1/06 | 227/8 |
| 2017/0001291 | A1 * | 1/2017 | Schnell | B25C 1/00 | |
| 2018/0036870 | A1 * | 2/2018 | Komazaki | B25C 1/06 | |
| 2018/0055552 | A1 * | 3/2018 | Pedicini | A61B 17/92 | |
| 2019/0390430 | A1 * | 12/2019 | Goldsworthy | E21B 7/027 | |
| 2022/0355460 | A1 * | 11/2022 | Carrier | B25F 5/02 | |

* cited by examiner

IMPACTING APPARATUS

CROSS-REFERENCE TO RELATED APPLICATIONS

The present disclosure claims priority under 35 United States Code, Section 119 on the pending United States Provisional Patent Application numbered 63/507,048, filed on Jun. 8, 2023, the disclosure of which is incorporated by reference.

FIELD OF THE DISCLOSURE

The present disclosure relates to impacting apparatuses, and, more particularly, to such impacting apparatus for driving fence posts, breaking concrete, setting rivets, driving nails and otherwise performing multiple continuous impacts.

BACKGROUND

Impacting apparatuses (also referred to herein as a "driver," "gun" or "device") known in the art often may be configured for an entirely portable operation. Contractors commonly use power-assisted devices for impacting a surface and/or driving an object into a substrate. These power-assisted apparatuses can be portable (i.e., not connected or tethered to an air compressor or wall outlet) or non-portable.

A common impacting apparatus uses a source of compressed air to actuate a guide assembly to push an object into a substrate. For applications in which portability is not required, this is a very functional system and allows rapid delivery of fasteners for quick assembly. A disadvantage is that it does however require that the user purchase an air compressor and associated air lines in order to use this system. A further disadvantage is the inconvenience of the device being tethered (through an air hose) to an air compressor.

To solve this problem, several types of portable impacting devices operate off of fuel cells. Typically, these guns have a guide assembly in which a fuel is introduced along with oxygen from the air. The subsequent mixture is ignited with the resulting expansion of gases pushing the guide assembly and thus driving an object into a substrate. This design is complicated and expensive. Both electricity and fuel are required as the spark source derives its energy typically from batteries. The chambering of an explosive mixture of fuel, the use of consumable fuel cartridges, the loud report and the release of combustion products are all disadvantages of this solution.

A final commercially available solution is to use a flywheel mechanism and clutch the flywheel to a striker that impacts a substrate. This tool is capable of impacting very quickly. The primary drawback to such a tool is the large weight and size as compared to pneumatic counterparts. Additionally, the drive mechanism is very complicated, which gives a high retail cost.

Clearly, and based on the above efforts, a need exists to provide portable solution for impacting that is unencumbered by fuel cells or air hoses. Additionally, the solution ought to provide a low reactionary feel, and be simple, cost effective and robust in operation.

The prior art teaches several additional ways of impacting. The first technique is based on a multiple impact design. In this design, a motor or other power source is connected to an impact striker through either a lost motion coupling or other device. This allows the power source to make multiple impacts on an object to drive it into a substrate. However, such multiple impact designs are not very efficient because of the constant motion reversal and the limited operator production speed.

A second design includes the use of potential energy storage mechanisms (in the form of a mechanical spring). In these designs, the spring is cocked (or activated) through an electric motor. Once the spring is sufficiently compressed, the energy is released from the spring into a striker, thus impacting the striker and/or a substrate. Several drawbacks exist to this design. These include the need for a complex system of compressing and controlling the spring, and in order to store sufficient energy, the spring must be very heavy and bulky. Additionally, the spring suffers from fatigue, which gives the tool a very short life. Finally, metal springs must move a significant amount of mass in order to decompress, and the result is that these low-speed impacting devices result in a high reactionary force on the user.

To improve upon this design, an air spring has been used to replace the mechanical spring, i.e., compressing air within a guide assembly and then releasing the compressed air by use of a gear drive. One particularly troublesome issue with this design is the safety hazard in the event that the striker jams on the downward stroke and the operator tries to clear the jam, he is subject to the full force of the striker, since the striker is predisposed to the down position in all of these types of devices. A further disadvantage to the air spring results from the need to have the ratcheting mechanism as part of the striker drive. This mechanism adds weight and causes significant problems in controlling the drive action since the weight must be stopped at the end of the stroke. This added mass slows the drive stroke and increases the reactionary force on the operator. Additionally, because significant kinetic energy is contained within the air spring and piston assembly the unit suffers from poor efficiency. This design is further subject to a complicated drive system for coupling and uncoupling the air spring and ratchet from the drive train, which increases the production cost and reduces the system reliability.

A third means for impacting that is taught includes the use of flywheels as energy storage means. The flywheels are used to launch a hammering striker that impacts a substrate. One major drawback to this design is the problem of coupling the flywheel to the driving striker. This prior art teaches the use of a friction clutching mechanism that is both complicated, heavy and subject to wear. Further limiting this approach is the difficulty in controlling the energy—the mechanism requires enough energy to impact effectively, but retains significant energy in the flywheel after the drive is complete. This further increases the design complexity and size of such prior art devices.

All of the currently available devices suffer from one or more the following disadvantages:

- Complex, expensive and unreliable designs. Fuel powered mechanisms such as Paslode™ achieve portability but require consumable fuels and are expensive. Rotating flywheel designs such as Dewalt™ have complicated coupling or clutching mechanisms based on frictional means. This adds to their expense.
- Poor ergonomics. The fuel powered mechanisms have loud combustion reports and combustion fumes. The multiple impact devices are fatiguing and are noisy.
- Non-portability. Traditional impacting devices are tethered to a fixed compressor and thus must maintain a separate supply line.
- High reaction force and short life. Mechanical spring driven mechanisms have high tool reaction forces because of their long drive times. Additionally, the springs are not rated for these types of duty cycles leading to premature failure.

Safety issues. The prior art "air spring" and heavy spring driven designs suffer from safety issues for impacting since the predisposition of the striker is towards the substrate. During jam clearing, this can cause the striker to strike the operator's hand.

The return mechanisms in most of these devices involve taking some of the drive energy. Either there is a bungee or spring return of the driving striker assembly or there is a vacuum or air pressure spring formed during the movement of the striker. All of these mechanisms take energy away from the drive stroke and decrease efficiency.

In light of these various disadvantages, there exists the need for a fastener driving apparatus that overcomes these various disadvantages of the prior art, while still retaining the benefits of the prior art.

SUMMARY OF THE DISCLOSURE

In accordance with the present disclosure, an impacting apparatus is described which derives its power from an electrical source, preferably rechargeable batteries, and uses a motor to actuate a spring striker assembly. The spring striker assembly can include either a mechanical spring or a gas spring piston that is coupled to a striker (also sometimes referred to as an anvil). In an embodiment where the spring is a mechanical spring, the spring may be comprised of titanium, carbon fiber, an elastomer or steel, for example. After a sufficient movement of a piston in the spring striker assembly, the piston commences movement and accelerates the spring striker assembly (which assembly includes an striker and a spring piston, such as a gas spring piston.) The pressure in the gas the spring causes the spring striker assembly to move, and in an embodiment, the movement is toward and into contact with a substrate or striker cup such that the striker impacts the substrate or striker cup. A post, fastener or other driven object can position the spring striker assembly for the commencement of another operating cycle.

By using a gas spring in the spring striker assembly with a piston stroke, the present impacting apparatus is able to generate sufficient energy to impact a substrate and/or drive an object with only a small increase in pressure in the gas spring. This unexpectedly increased the efficiency of the apparatus since heat of compression is a significant source of energy inefficiency. In an embodiment, the gas spring is replaceable. In another embodiment, the gas spring is slightly pressurized upon installation in the apparatus.

The impacting/driving cycle of the apparatus disclosed herein may start with an electrical signal, after which a circuit connects a motor to the electrical power source. The motor is coupled to the spring striker assembly through an interrupted drive mechanism, or any other drive mechanism capable of providing for continuous impacting/driving. In an operational cycle of the drive mechanism, the mechanism alternatively (1) actuates the piston of the spring striker assembly and (2) decouples from the spring striker assembly to allow pressure or other force(s) to act on the spring piston. For example, during a portion of its cycle, an interrupted drive mechanism may move the piston to increase potential energy stored within the spring assembly. In the next step of the cycle, the mechanism decouples from the spring striker assembly to allow the accumulated potential energy within the spring assembly to act on and actuate the piston and striker. The piston and striker thereupon move and impact a striker cup to drive an object, for example. In an embodiment, at least one bumper is disposed within or outside of the spring striker assembly to reduce wear and tear on the spring striker assembly that may otherwise occur in operation of the apparatus.

In an embodiment, a sensor and a control circuit are provided for determining at least one position of the gas spring and/or striker or striker cup to enable the proper timing for stopping the cycle of the apparatus and/or to detect a jam condition of the apparatus.

Accordingly, and in addition to the objects and advantages of the portable impacting apparatus as described above, several objects and advantages of the present disclosure are:

To provide a simple design for impacting apparatuses that has a significantly lower production cost than currently available devices and that is portable and does not require an air compressor.

To provide an impacting apparatus that mimics the pneumatic fastener performance without a tethered air compressor or gasoline engine.

To provide an electrical driven high power impacting apparatus that has very little wear.

To provide a more energy efficient mechanism for driving objects and impacting substrates than is presently achievable with a compressed air design.

These together with other aspects of the present disclosure, along with the various features of novelty that characterize the present disclosure, are pointed out with particularity in the claims annexed hereto and form a part of the present disclosure. For a better understanding of the present disclosure, its operating advantages, and the specific objects attained by its uses, reference should be made to the accompanying drawings and detailed description in which there are illustrated and described exemplary embodiments of the present disclosure.

DESCRIPTION OF THE DRAWINGS

The advantages and features of the present disclosure will become better understood with reference to the following detailed description and claims taken in conjunction with the accompanying drawings, wherein like elements are identified with like symbols, and in which reference numerals refer to like parts throughout the description of several views of the drawings, in which

FIG. 20 shows components of a drive mechanism of an impacting apparatus, in accordance with an exemplary embodiment of the present disclosure;

FIG. 21 shows a cutaway view of an impacting apparatus, in accordance with an exemplary embodiment of the present disclosure;

FIG. 22 shows striker rollers and a striker cup of an impacting apparatus, in accordance with an exemplary embodiment of the present disclosure; and FIG. 23 shows a cutaway view of an impacting apparatus, in accordance with an exemplary embodiment of the present disclosure.

DETAILED DESCRIPTION OF THE DISCLOSURE

Figure 1:
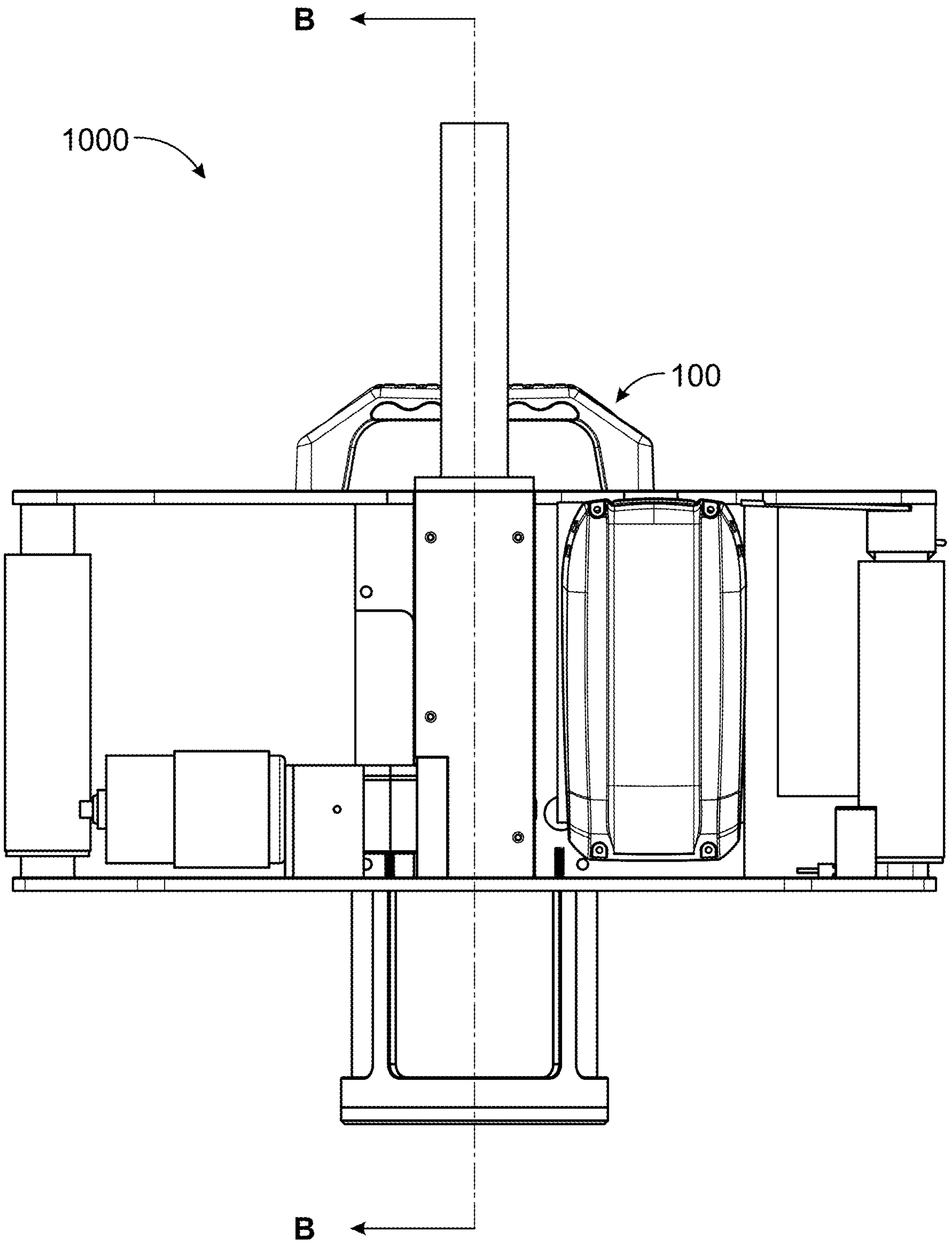
FIG. 1 shows a cross-sectional view of an impacting apparatus, in accordance with an exemplary embodiment of the present disclosure.
Figure 2:
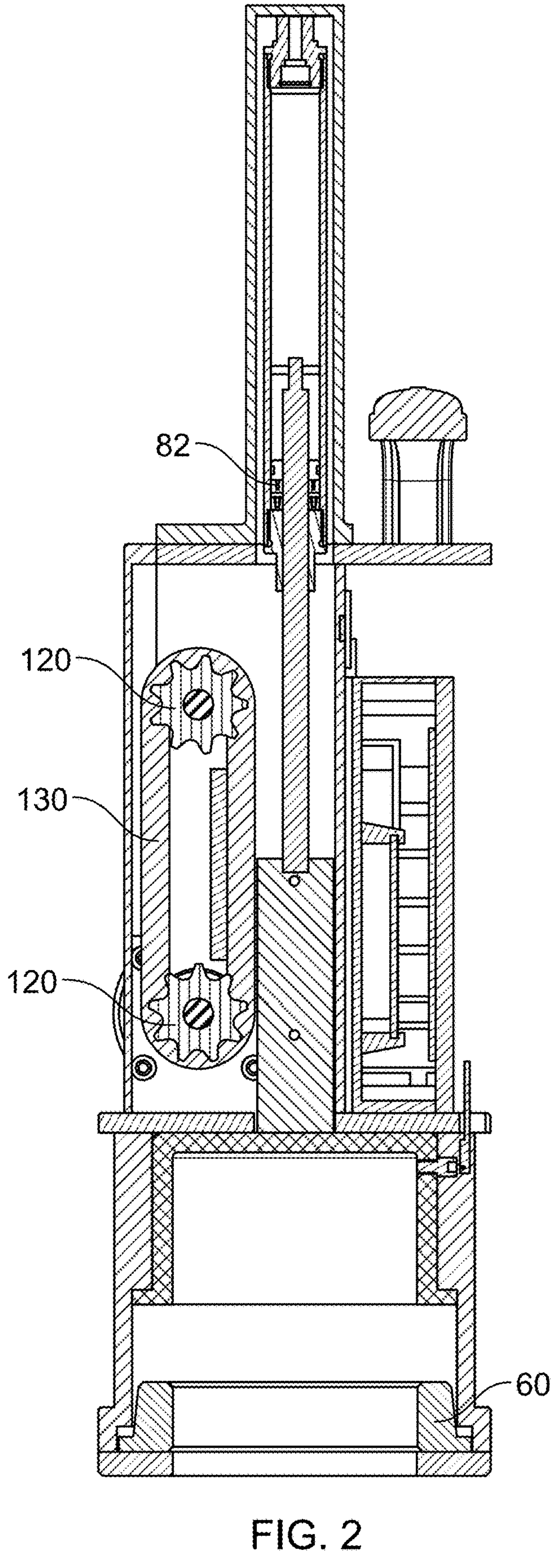
FIG. 2 shows another cross-sectional view of an impacting apparatus, in accordance with an exemplary embodiment of the present disclosure.

The best mode for carrying out the present disclosure is presented in terms of its preferred embodiment, herein depicted in the accompanying figures. The preferred embodiments described herein detail for illustrative purposes are subject to many variations. It is understood that various omissions and substitutions of equivalents are contemplated as circumstances may suggest or render expedient but are intended to cover the application or implementation without departing from the spirit or scope of the present disclosure. Furthermore, although the following relates substantially to one embodiment of the design, it will be understood by those familiar with the art that changes to materials, part descriptions and geometries can be made without departing from the spirit of the disclosure. It is further understood that references such as front, back, top dead center, or bottom dead center do not refer to exact positions, but approximate positions as understood in the context of the geometry in the attached figures.

The terms "a" and "an" herein do not denote a limitation of quantity, but rather denote the presence of at least one of the referenced items.

The present disclosure provides for an impacting apparatus 1000. In an embodiment, the apparatus comprises a power source 30, a control circuit 20, a motor 10, a gas spring 70, a drive mechanism 15, a spring striker assembly 40, a striker 50, a striker cup 55 and at least one bumper 60. The apparatus also comprises a handle 100 and a start switch 170. The gas spring includes a piston 72 that is at least partially disposed within the spring striker assembly, and which spring striker assembly is operatively coupled to the drive mechanism.

The gas spring of the present disclosure also includes a cylinder 80 and one or more cup seals 82. The cup seals make a rod seal around the spring piston 72. The configuration is highly advantageous because it allows for a long stroke, a small increase in cylinder pressure and a small size.

In an embodiment, the gas spring has a threaded member 76 adjacent to the gas spring piston. This threaded member allows the user to change out gas springs on the impacting device. Impacting devices require a long lifecycle that involves hundreds of thousands of impact cycles. Traditional gas springs cannot meet this requirement, therefore it is critical to change out the gas springs quickly and safely during service intervals. One method for doing this is to screw the gas springs into the impacting apparatus, which method will be discussed in detail below.

Additionally, it is important that the gas spring piston stays in alignment as it is being compressed. If the gas spring piston and the gas spring cylinder are not co-linear, unnecessary stress may be placed on the gas spring seal and the life of the gas spring may be shortened. Accordingly, in an embodiment, the apparatus comprises a gas spring mount 77 with at least one degree of freedom, on which mount the gas spring is disposed. If the mount is allowed to roll, yaw or move laterally, the gas spring piston can stay co-linear with the gas spring cylinder.

Figure 3:
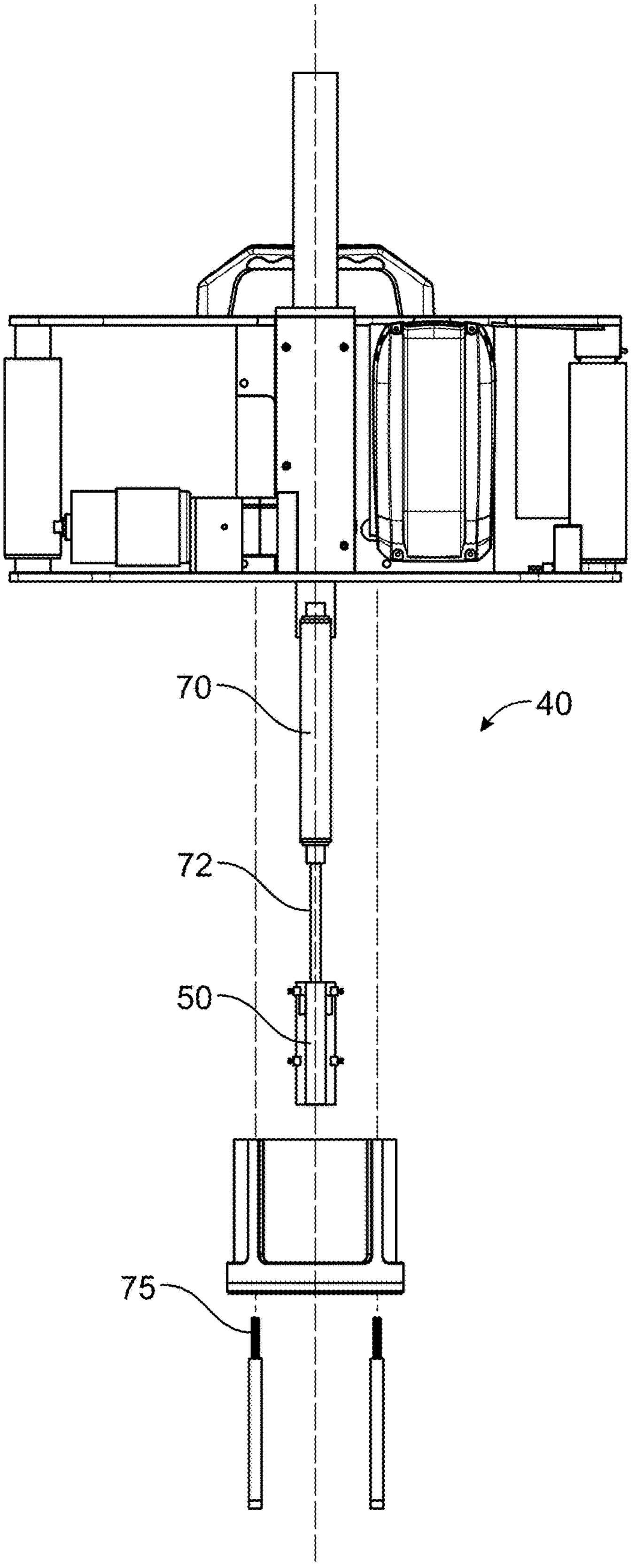
FIG. 3 shows a disassembled view of an impacting apparatus, in accordance with an exemplary embodiment of the present disclosure.
Figure 4:
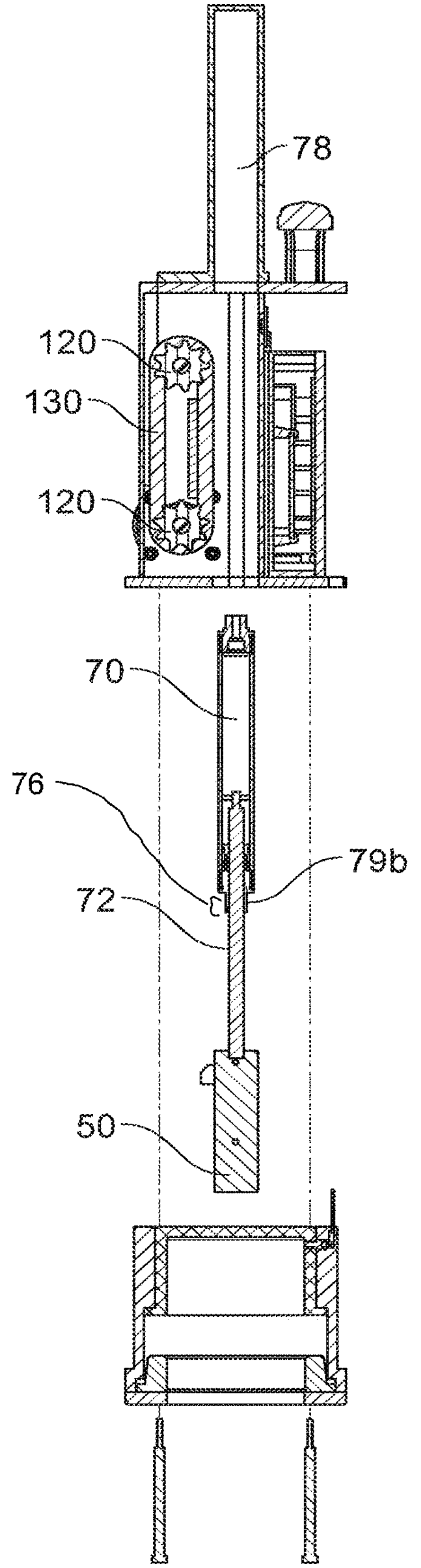
FIG. 4 shows another disassembled view an impacting apparatus, in accordance with an exemplary embodiment of the present disclosure.
Figure 5:
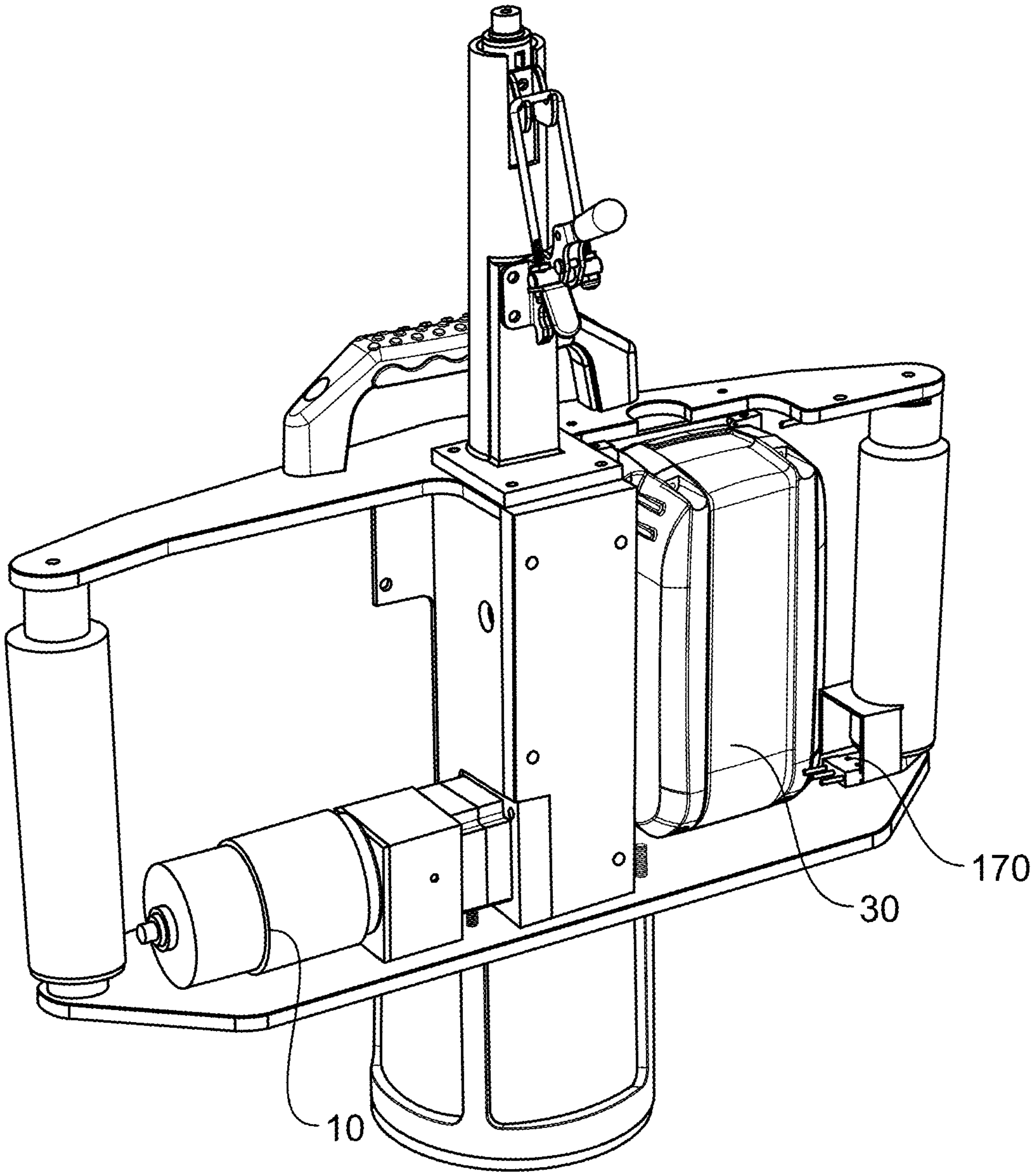
FIG. 5 shows a cutaway view of an impacting apparatus, in accordance with an exemplary embodiment of the present disclosure.
Figure 6:
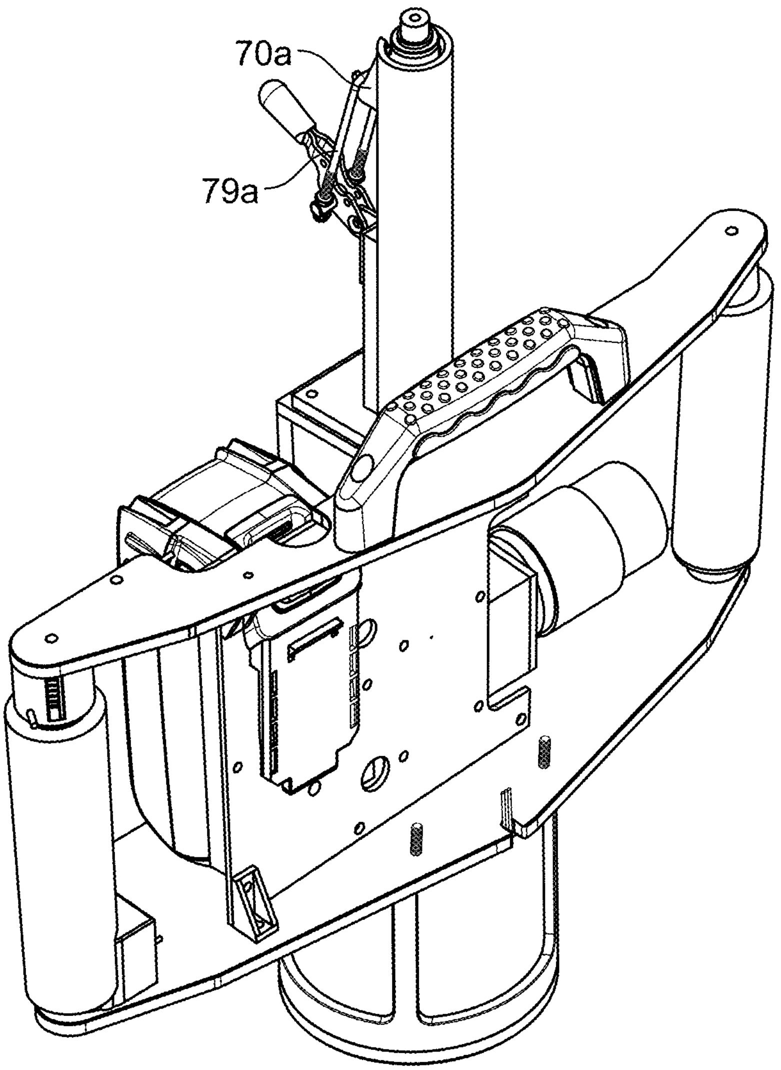
FIG. 6 shows another cutaway view of an impacting apparatus, in accordance with an exemplary embodiment of the present disclosure.
Figure 7:
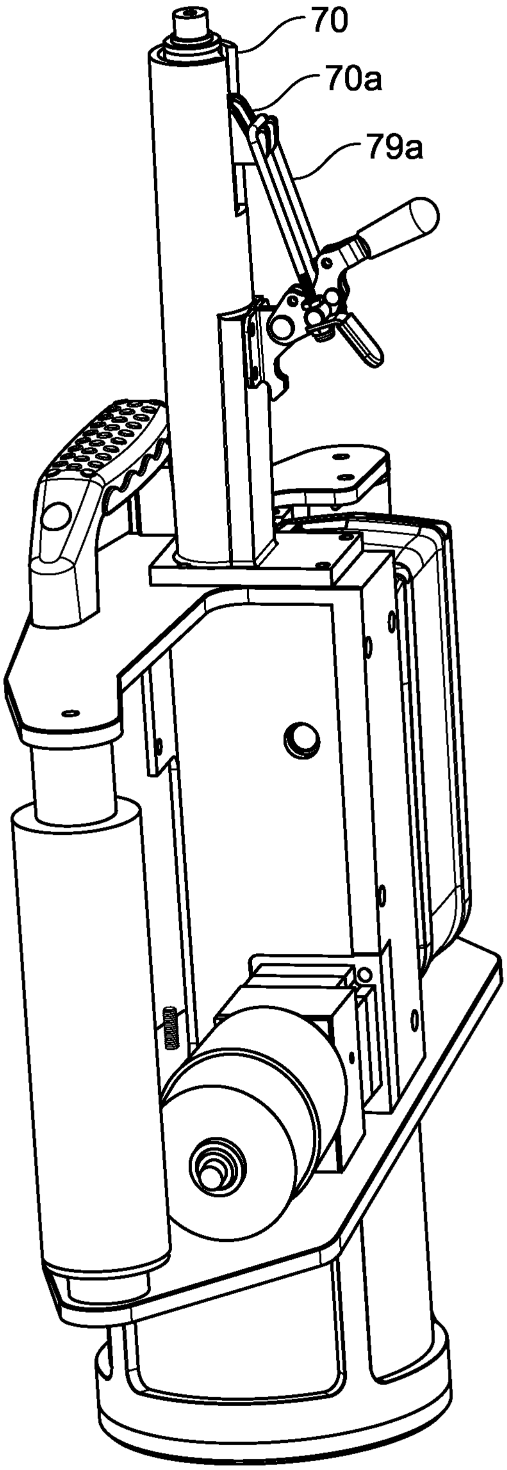
FIG. 7 shows another cutaway view of an impacting apparatus, in accordance with an exemplary embodiment of the present disclosure.
Figure 8:
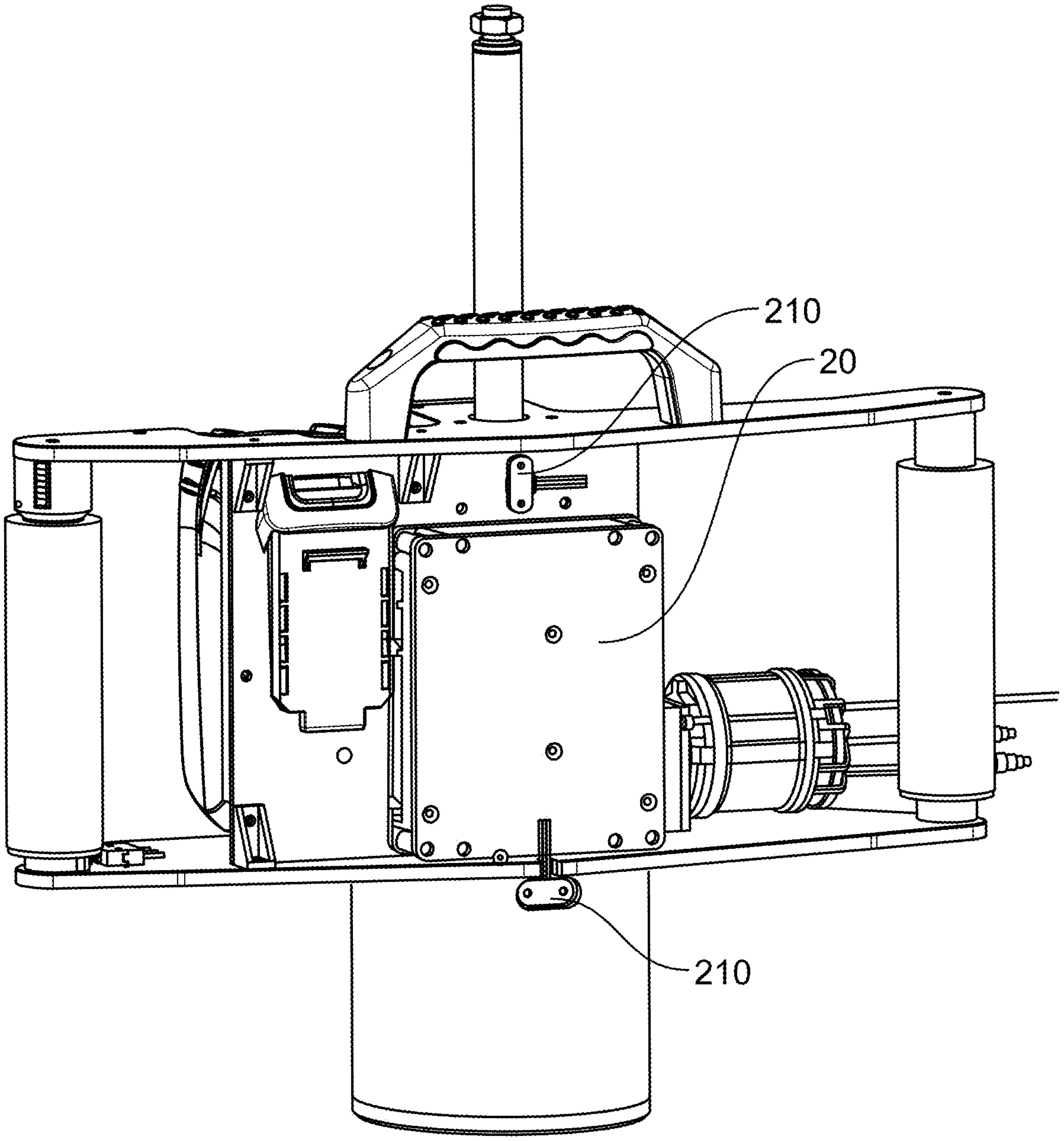
FIG. 8 shows another cutaway view of an impacting apparatus, in accordance with an exemplary embodiment of the present disclosure.

In another embodiment, the gas spring is replaceable and becomes slightly energized when installed in the apparatus. In such an embodiment, the apparatus comprises a gas spring preload means for installing the gas spring in the apparatus. The gas spring preload means also facilitates the quick and safe replacement of a gas spring 70 of the apparatus. In an embodiment, the apparatus comprises a cavity 78 in which the gas spring is installed for operation. The cavity may be accessed by removing screws 75 from a portion of the housing of the apparatus that is proximate to the striker cup and/or bumper of the apparatus and that is secured to the apparatus by screws or other suitable fastener. When the housing portion is removed, the striker cup 55 and/or bumper 60 may thereafter be removed to gain access to the gas spring cavity 78 (and gas spring, if a gas spring is being replaced). The new gas spring is placed in the cavity 78, and the bumper and/or striker cup are reinstalled. In an embodiment, and as shown in FIG. 3 the housing portion is replaced, and the screws are of sufficient length that the housing portion can be fastened and drawn toward the gas spring sufficiently that the housing can abut and slightly compress and energizes the gas spring while the gas spring is a position where the spring striker assembly is not being acted on by the drive assembly. This prevents the gas spring piston from bottoming out in the gas spring cylinder.

In another embodiment, the gas spring 70 comprises a threaded member 76 for threadable engagement with the apparatus. In this embodiment, the apparatus also comprises threads 79 for receiving the gas spring in a threaded region 79*b*. In such an embodiment, the threads of the gas spring must be long enough to start screwing into the device without the gas spring piston engaging the striker. Once the threads have been engaged with the threaded region, the gas spring piston can engage the striker and continued rotation of the gas spring can energize or preload the gas spring. It is important to note that the gas spring piston should not touch the inside of the cylinder as damage would occur during each impact. Other methods such as a quick release may also be used. The gas spring attachment means may also comprise a camming mechanism, a mechanical advantage or mechanism, and the like.

An alternate method for gas spring replacement involves the use of a toggle clamp 79*a* to compress and energize the gas spring. In such an embodiment a toggle clamp 79*a* is affixed to the top of the apparatus 1000 and engages with a flange 70*a* that is welded to the gas spring. Moving the handle of the toggle clamp downward engages and energizes the gas spring. Moving the handle of the toggle clamp upward releases the gas spring and allows it to be removed from the top of the apparatus for easy replacement. The toggle clamp can have a locking mechanism (not shown) that prevents it from releasing the gas spring when the apparatus is in use.

It is important to note that the gas spring 70 should never be removed from the apparatus when it is under load from the drive mechanism 15. If it is engaged with the drive mechanism, the stored energy in the gas spring may be released upon spring removal, which poses an injury threat to the user. To ensure that the gas spring is not under load from the drive mechanism, the drive mechanism must be in a known specific position. This can be accomplished by stopping the drive mechanism with a sensor 210 in a specified location or allowing the mechanism to back drive to allow the gas spring to de-energize.

The drive mechanism 15 may comprise, in an embodiment, a chain 130 and sprockets 120 as shown in the figures. The chain has two or more lifter links 150 spaced equidistant along the chain. In such an embodiment, it will be apparent that the drive mechanism is configured to permit effectively instantaneous transition from when the lifter links are engaged with the spring striker assembly to when there is no engagement. The drive mechanism 15 is operatively coupled to the spring striker assembly 40, such that the drive mechanism may alternate in actuating the spring striker assembly, thereby actuating the piston 72 (when the lifter link is engaged, for example) and in withholding a drive force on the spring striker assembly such as for a portion of the operational cycle of the apparatus.

In an embodiment, the drive mechanism 15 engages the spring striker assembly 40 and actuates the piston by pushing upwards by the striker to store potential energy within the gas spring 70. In an embodiment, the initial pressure (before the drive mechanism actuates the piston) within the gas spring is at least 40 psia. In an embodiment, the present disclosure utilizes a pressure of 1500 psi on an 8 mm spring piston. The configuration and design of the gas spring are such that the pressure increase during the piston movement is less than 30% of the initial pressure, thus yielding a more constant torque to the motor that improves the motor efficiency. The drive mechanism thereafter disengages the spring striker assembly, allowing pressure or other forces to act on the piston causing the piston and striker to move away from the cylinder 80 and towards the striker cup 55. The drive mechanism is tuned to prevent further engagement until after the spring striker assembly has returned to an approximate starting position. The drive mechanism may thereafter again act on the spring striker assembly to again store potential energy within the gas spring and may thereafter again temporarily cease to act on the spring striker assembly to allow potential energy to instead act on the piston to rapidly move the striker to impact the striker cup. The drive mechanism is preferably configured to allow for continuous impacting, by way of sprockets 120 and a chain assembly (such as chain 130, for example (as shown in the figures), for such continuous impacting.

The drive mechanism 15 of the present disclosure may also include a one-way clutch 160 to prevent back rotation of the motor when the device is at rest. The one-way clutch can be disposed anywhere in the drive mechanism from the output sprockets to the motor shaft.

The spring striker assembly 40 is operatively coupled to the gas spring 70 (such as to the piston 72 or nose portion 74 thereof) such that when the spring striker assembly is released under pressure the force from the piston is imparted onto the striker, causing the piston and striker to move in a direction away from the cylinder 80 and impact a striker cup 55 of the apparatus, which striker cup transmits the force of the impact to an impact target 110, such as a post, nail, grounding rod, rivet, concrete surface, or ground surface, for example. The striker cup facilitates positioning of the impact target so that the impact target can receive the force of the striker and so that the impact target can remain in a position to receive such force when the apparatus is providing multiple or continuous impacts. It was discovered during the course of development that the ratio of the tool mass to the moving mass (i.e., the mass of the spring piston and striker) was important to the efficiency of the apparatus. It is preferred to have the moving mass be less than 20% of the total mass of the tool and more preferable to have the moving mass be less than 10% of the total mass. This allows the present disclosure to have increased efficiency in transferring the potential energy into driving energy on the object or substrate. The smaller the moving mass in relation to the total mass of the tool, the smaller the reaction force that drives the tool off of the impact target. Reaction force is a major loss of efficiency in existing impacting tools. In an embodiment, the spring striker assembly has a mass of 1.3 pounds and the tool has a total mass of 16 pounds. This represents an 8% ratio. The spring striker assembly may be operatively coupled to striker rollers 200 and roller channels 202, or other structure that limits its range of motion. Another unexpected discovery was that increasing the speed of the spring striker assembly during impact reduced the reaction force on the tool user.

At least one bumper 60 is disposed on the apparatus for absorbing a portion of the force of impact of the striker cup 55 when the striker 50 imparts its energy to drive or to strike the impact target 110. This is used to reduce wear and tear on the components of the apparatus. The at least one bumper may be of an elastic material and may be disposed on the apparatus at any position where it is capable of absorbing a portion of the force of impact of the striker.

In an embodiment, the drive mechanism 15 comprises a plurality of sprockets 120 (and, in a preferred embodiment, a first sprocket 120*a* and a second sprocket 120*b*), a chain 130 and a plurality of lifter links 150 that act on the striker 50 to engage the spring striker assembly 40 and to energize the gas spring upon translation of the chain assembly. Two or more lifter links (also referred to herein as lifting links)

can be used and are preferably spaced equidistantly apart along the chain. An unexpected discovery was that keeping the lifting links inline with the line of force improved the reliability of the engagement of the device. To improve the wear characteristics of the device, lifting rollers 140 may be provided to create a rolling release of the lifter link from the striker lifting surface or surfaces 180 of the striker 50. This dramatically reduces wear and improves the useful life of the device. It is also advantageous to angle the striker lifting surfaces at an incline towards the striker to lock the striker on the lifting link during its engagement. Using three or more lifting links can also improve the life of the device by reducing the wear per cycle of each link.

In an embodiment, the striker 50 in the spring striker assembly comprises striker rollers 200 and roller channels 202. The rollers are utilized to reduce the resistance and to counteract the offset force of the drive mechanism. This significantly increases the efficiency of the device. The channels are disposed along the exterior length of the striker. The striker rollers are captured and roll in the channels of the striker.

In an embodiment, the electronics of the apparatus comprise at least one sensor 210 that detects the location of either the striker 50 or the striker cup 55 to determine when to turn the motor 10 off after impacting is completed.

In another embodiment, a sensor is not provided. As an alternative, the one-way clutch 160 prevents the motor 10 from driving backward, when the motor stops anywhere in the cycle. This constitutes a simple mechanical method that maintains the safety of the device.

In another embodiment, neither a one-way clutch nor a sensor is provided. After impacting is completed, the energized spring back drives the mechanism and the spring is de energized leaving the device in a safe state.

Figure 9:
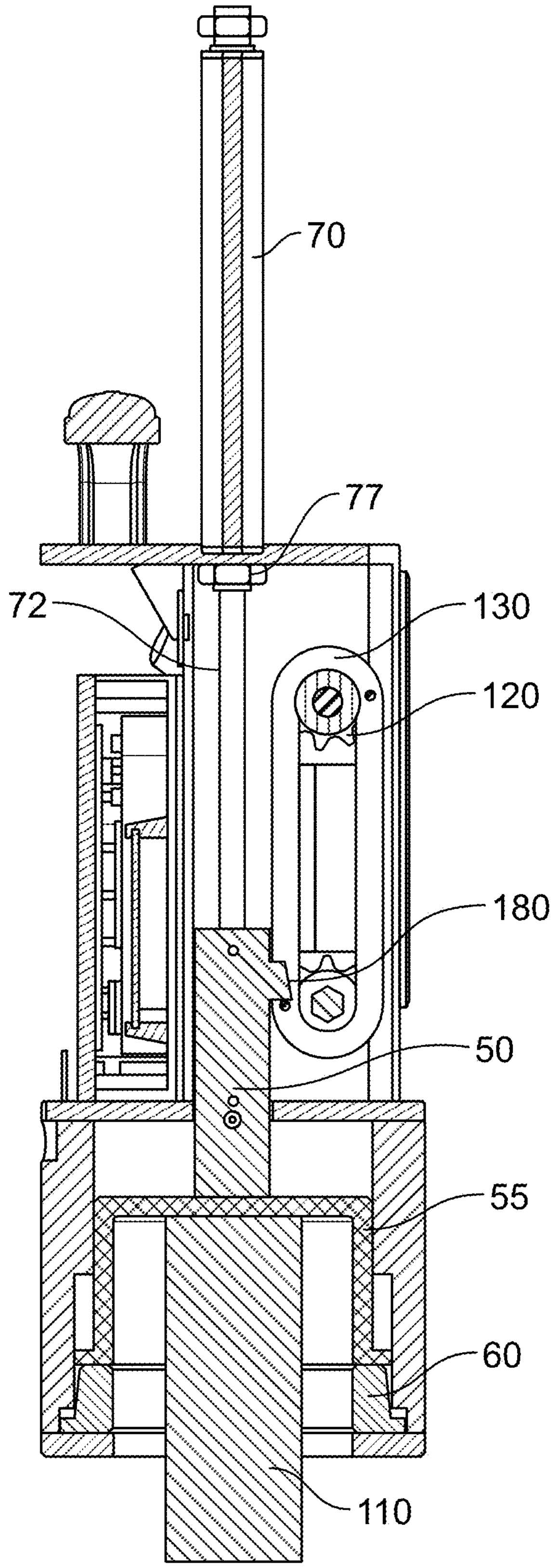
FIG. 9 shows another cutaway view of an impacting apparatus, in accordance with an exemplary embodiment of the present disclosure.
Figure 10:
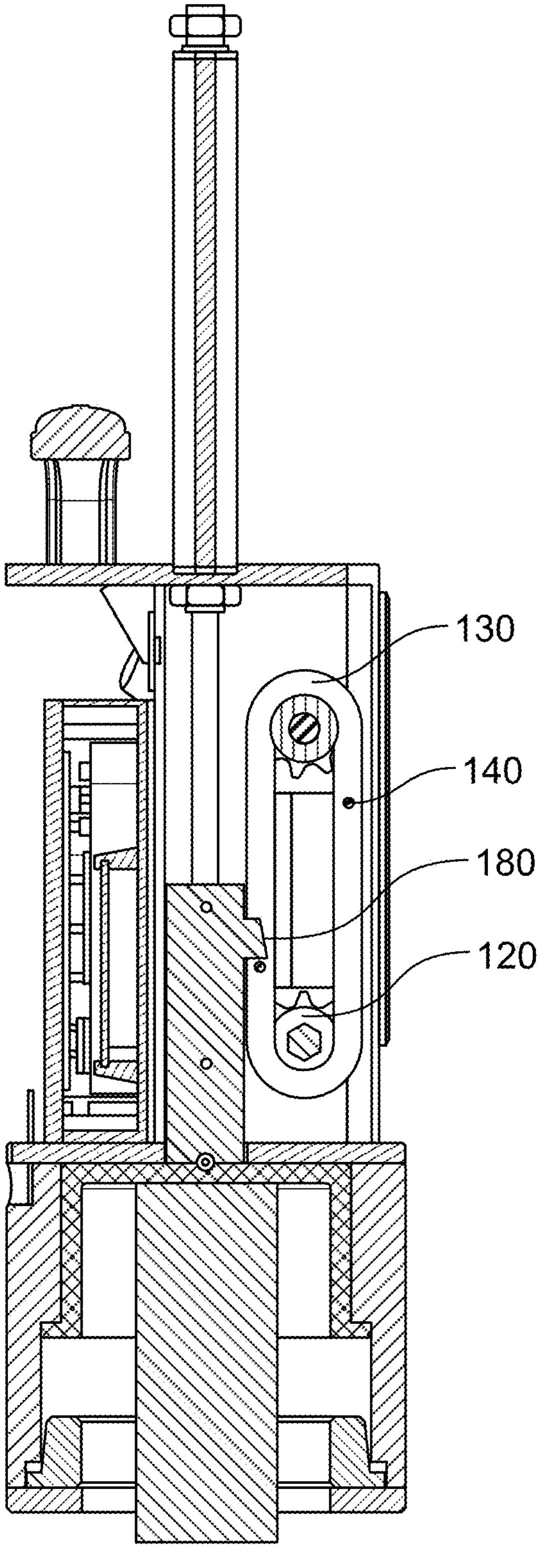
FIG. 10 shows another cutaway view of an impacting apparatus, in accordance with an exemplary embodiment of the present disclosure.
Figure 11:
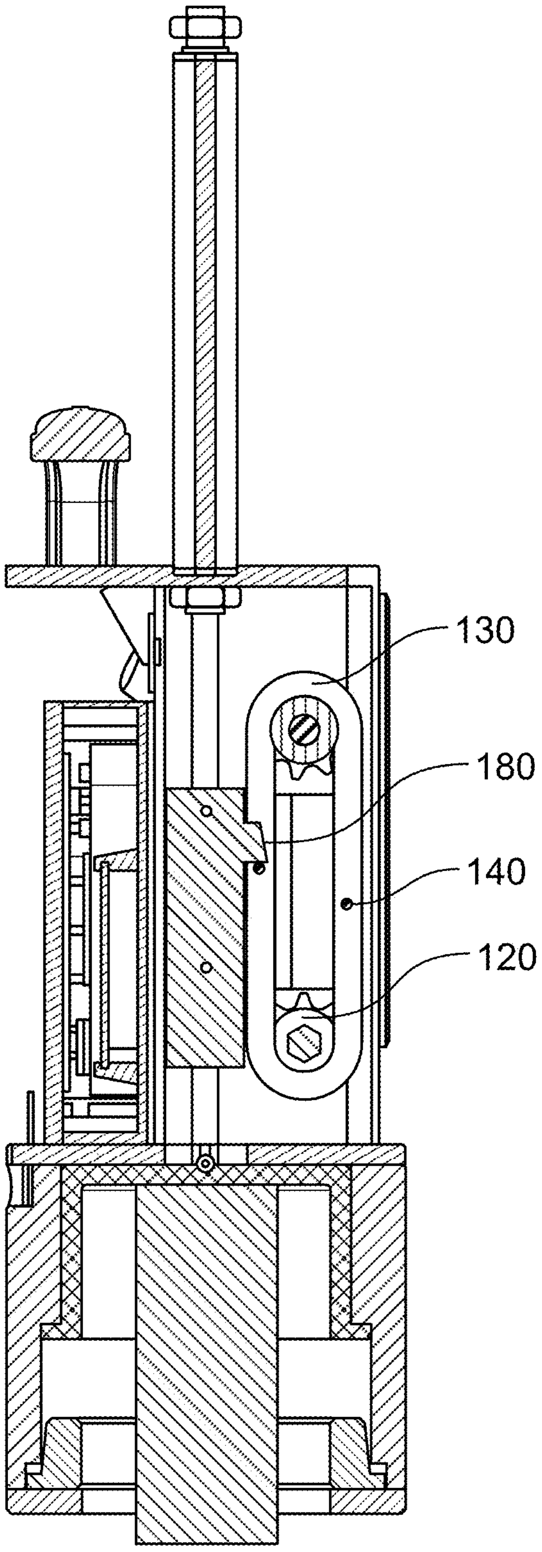
FIG. 11 shows another cutaway view of an impacting apparatus, in accordance with an exemplary embodiment of the present disclosure.
Figure 12:
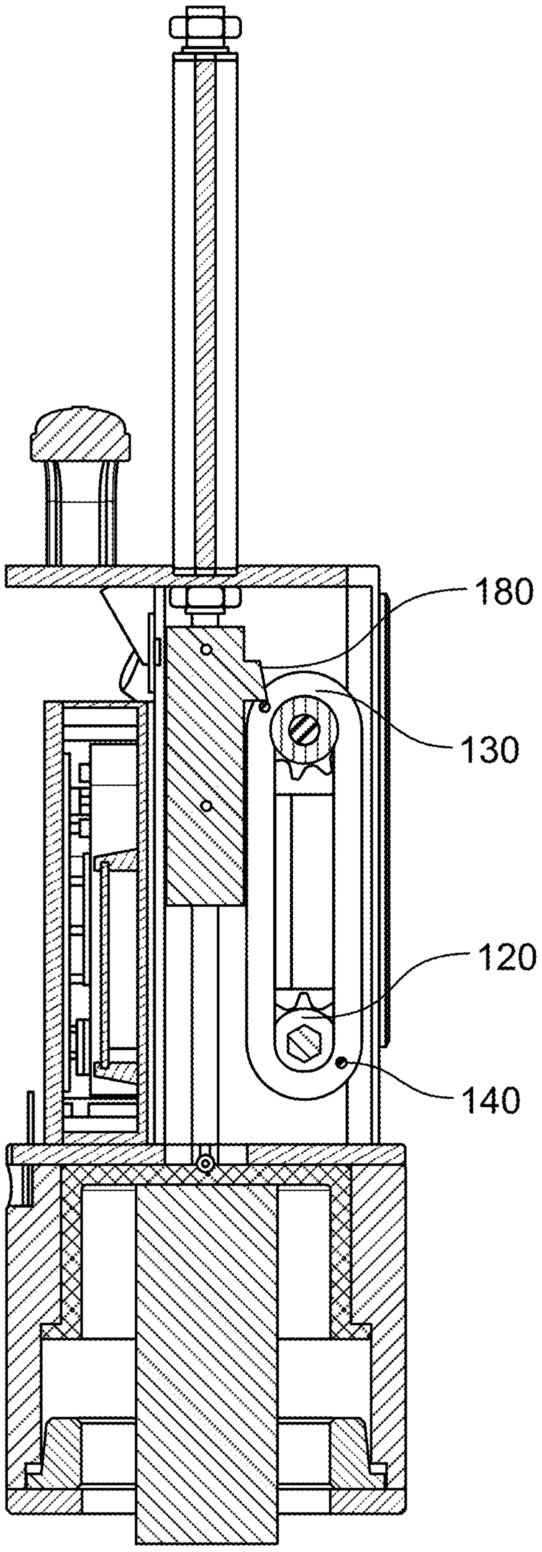
FIG. 12 shows a view of an operating cycle of an impacting apparatus, in accordance with an exemplary embodiment of the present disclosure.
Figure 13:
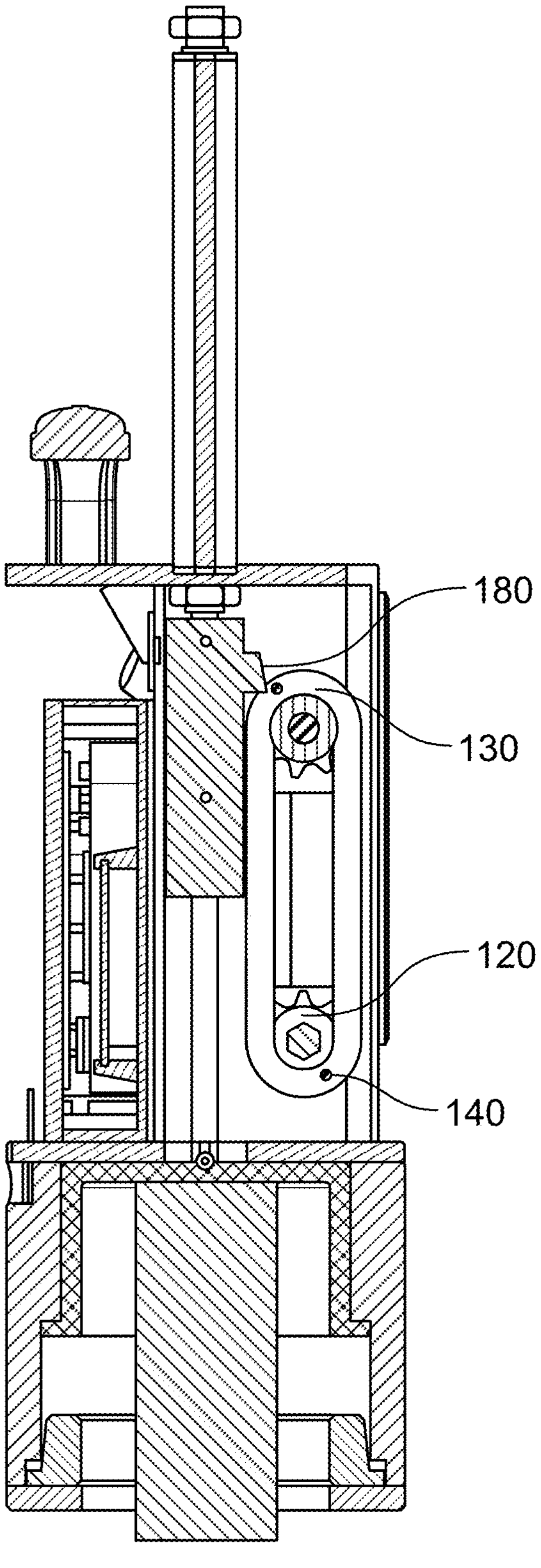
FIG. 13 shows a view of an operating cycle of an impacting apparatus, in accordance with an exemplary embodiment of the present disclosure.
Figure 14:
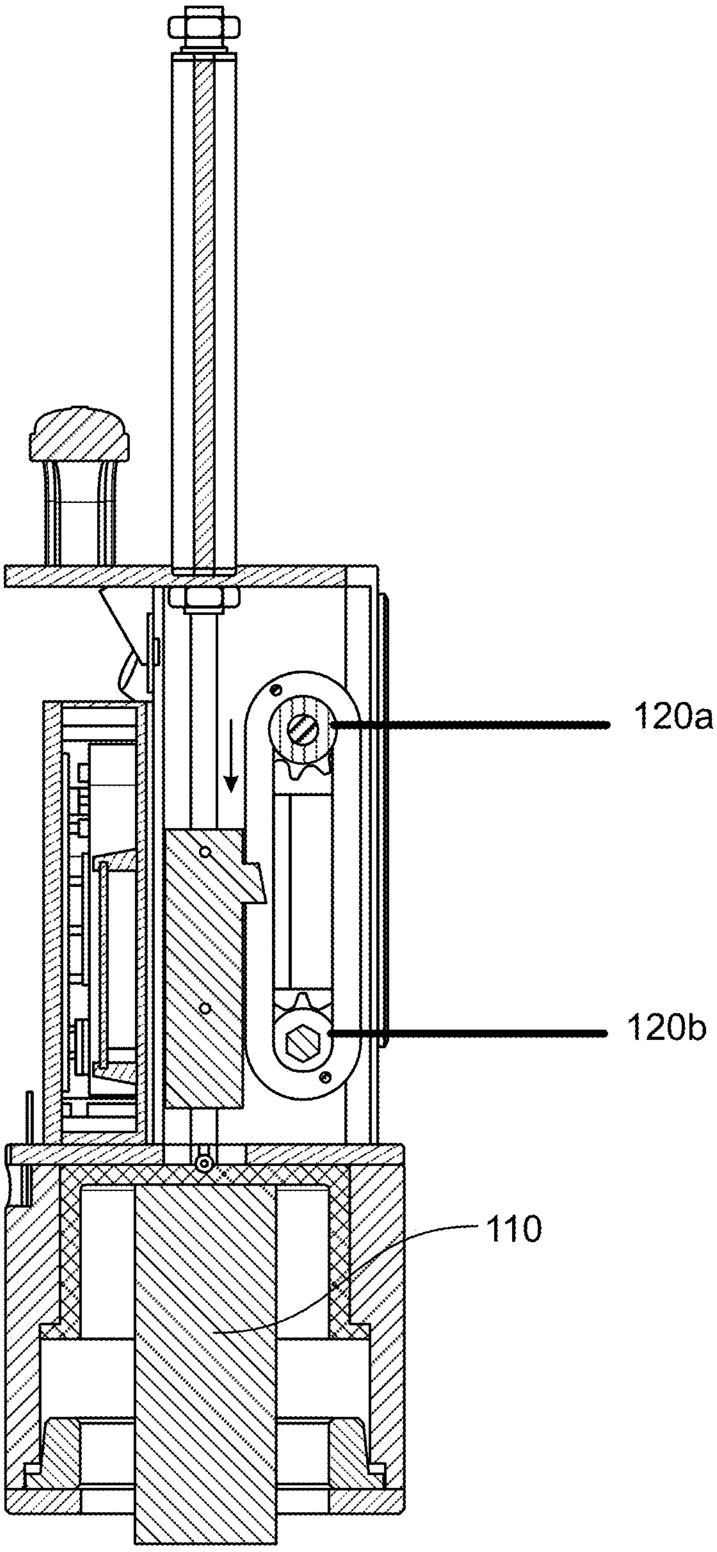
FIG. 14 shows a view of an operating cycle of an impacting apparatus, in accordance with an exemplary embodiment of the present disclosure.
Figure 15:
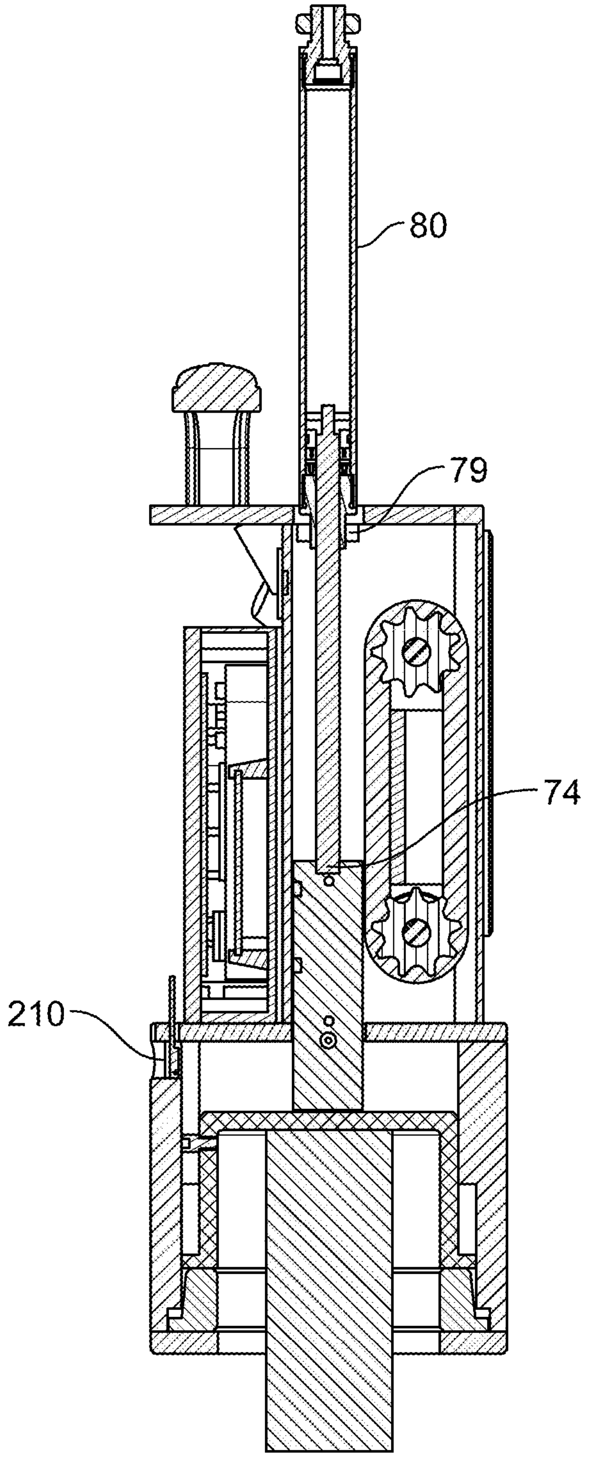
FIG. 15 shows a view of an operating cycle of an impacting apparatus, in accordance with an exemplary embodiment of the present disclosure.
Figure 16:
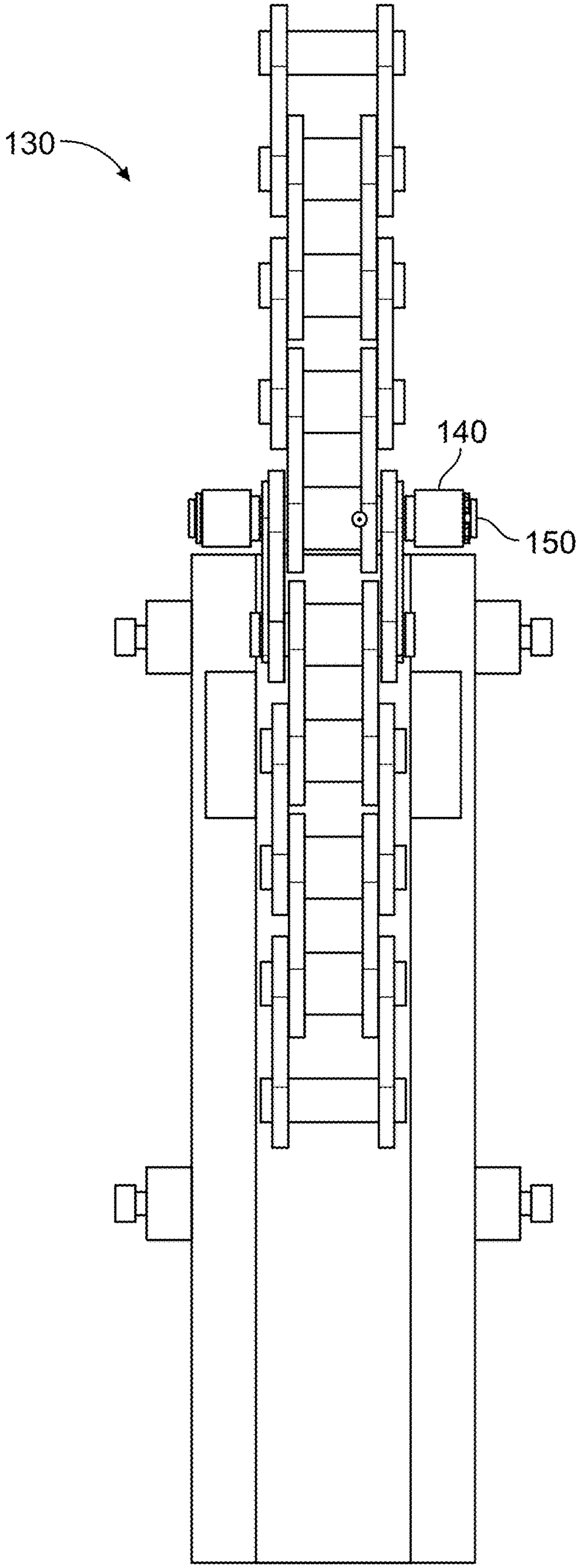
FIG. 16 shows a view of an operating cycle of an impacting apparatus, in accordance with an exemplary embodiment of the present disclosure.
Figure 17:
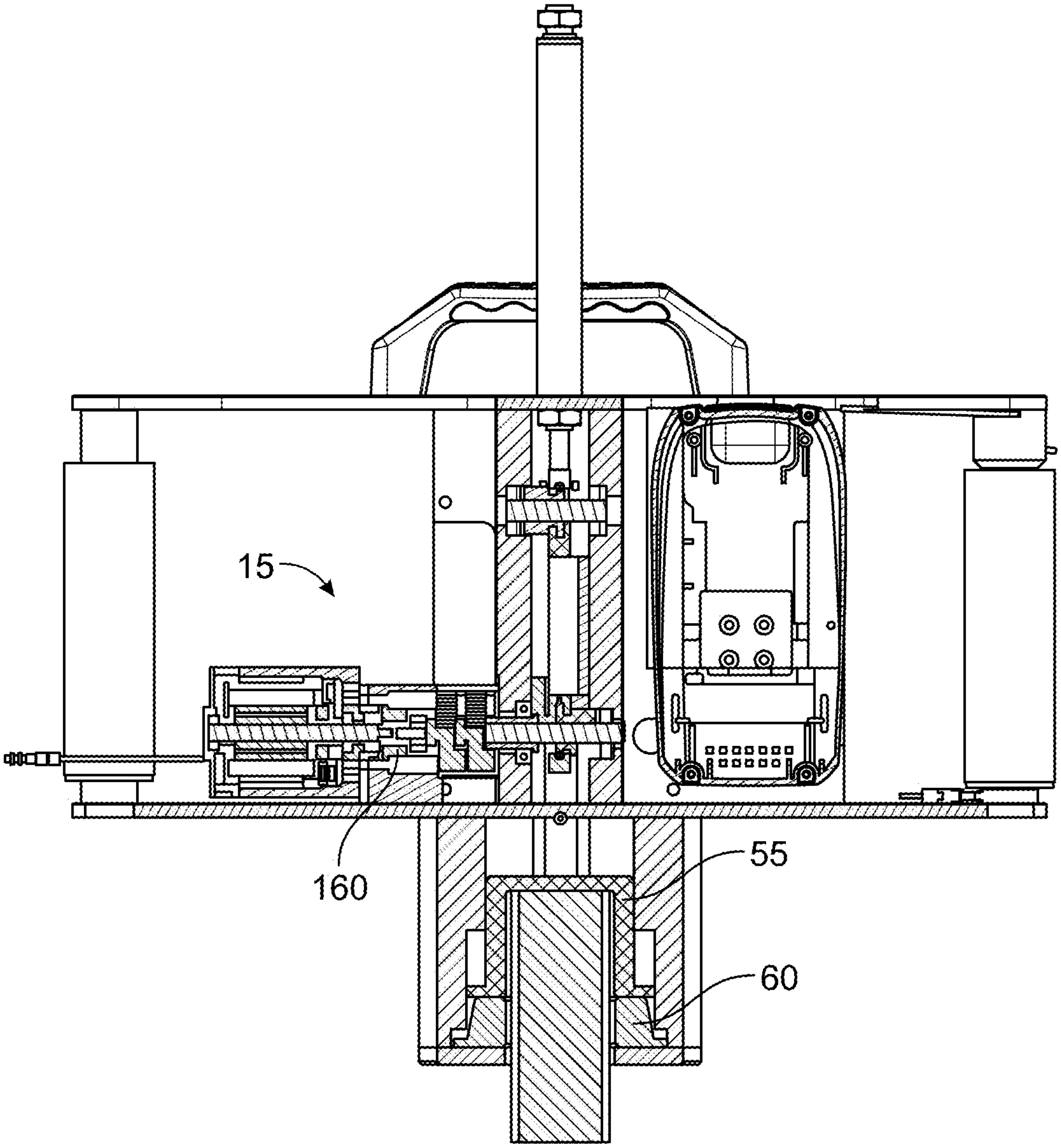
FIG. 17 shows a view of an operating cycle of an impacting apparatus, in accordance with an exemplary embodiment of the present disclosure.
Figure 18:
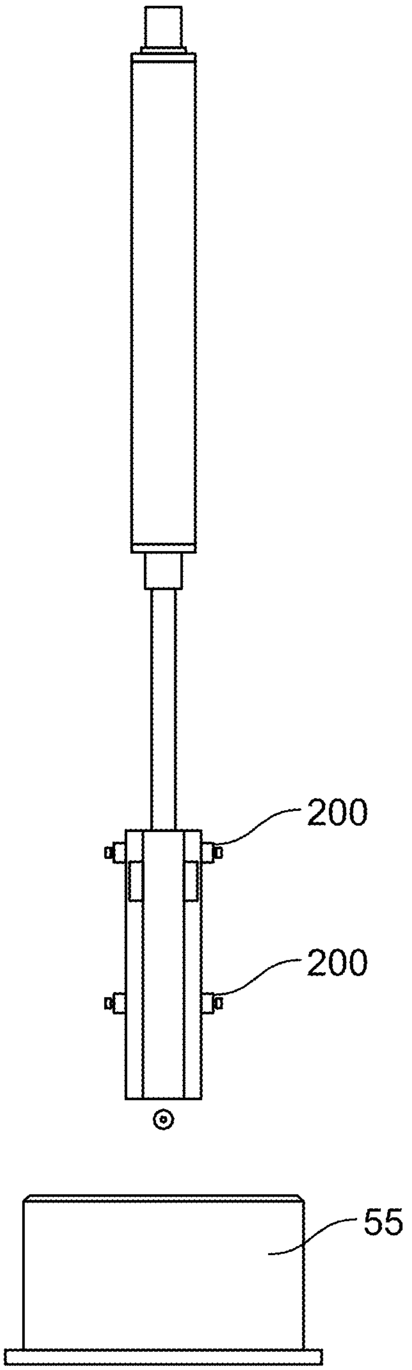
FIG. 18 shows a view of an operating cycle of an impacting apparatus, in accordance with an exemplary embodiment of the present disclosure.
Figure 19:
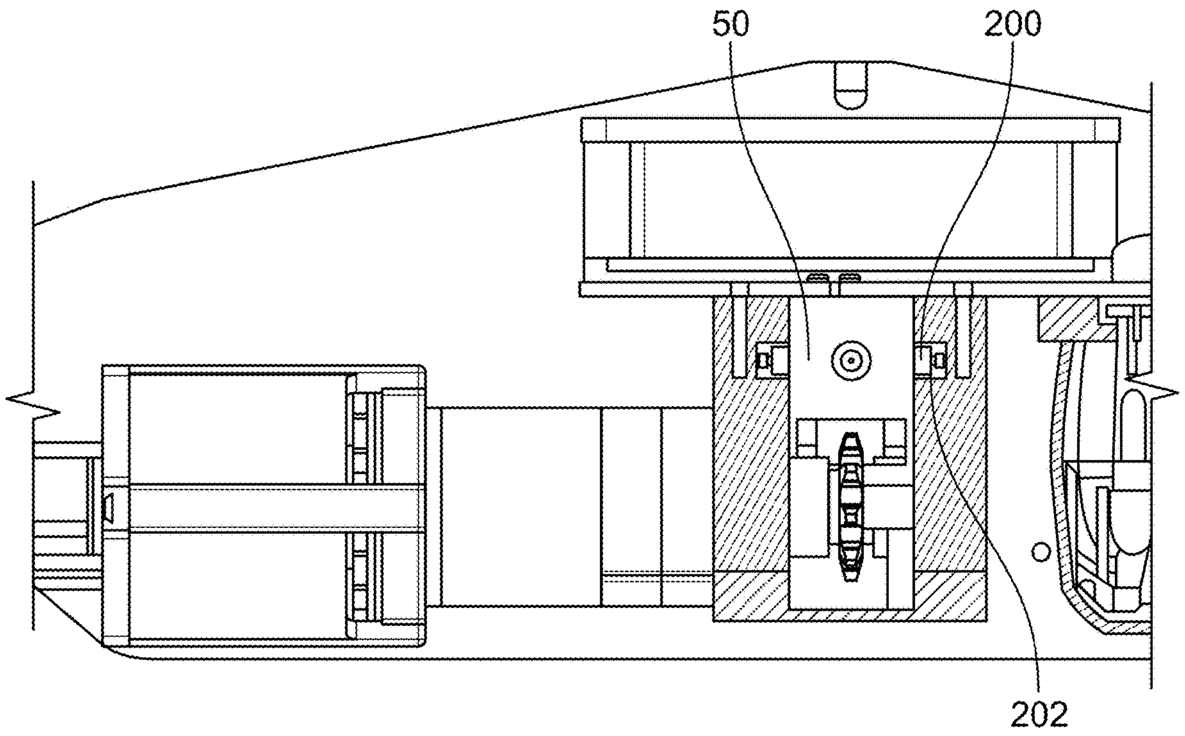
FIG. 19 shows a view of an operating cycle of an impacting apparatus, in accordance with an exemplary embodiment of the present disclosure.

In another embodiment of the apparatus 1000, movement of the handle 100 toward the impact target 110 may initiate the switching on of the motor 10. One or more of the handles can be spring-loaded or otherwise biased away from the impacting end of the apparatus (as shown in FIG. 9, for example) to allow pressing down on the handle(s) to initiate motor rotation and to stop the motor on release of the handle.

The present disclosure offers the following advantages: the gas spring is capable of generating a relatively high amount of force in a small amount of space such that the size of the apparatus may be smaller than other impacting apparatuses. Further, because of the relatively small increase from the initial pressure in the gas spring to the maximum pressure, the motor of the apparatus is not significantly overworked or overtorqued, thus leading to a longer useful life of the apparatus. Furthermore, the apparatus disclosed herein has an improved safety profile over prior art impacting devices. For example, the apparatus disclosed herein has an improved recoil force as opposed to the prior art. This was an unexpected discovery as the striker assembly of the present disclosure is low mass and, as such, during the driving of an object or striking a substrate, therefore does not put a reactionary force on the operator. In contrast, with conventional tools, a larger moving mass can result in significant recoil to the operator.

The foregoing descriptions of specific embodiments of the present disclosure have been presented for purposes of illustration and description. They are not intended to be exhaustive or to limit the present disclosure to the precise forms disclosed, and many modifications and variations are possible in light of the above teaching. The exemplary embodiment was chosen and described in order to best explain the principles of the present disclosure and its practical application, to thereby enable others skilled in the art to best utilize the disclosure and various embodiments with various modifications as are suited to the particular use contemplated.

What is claimed is:

1. An impacting apparatus, the apparatus comprising:

a power source, a control circuit, a motor, said motor capable of rotational motion, a striker cup, a spring striker assembly, said spring striker assembly comprising a gas spring and striker, said gas spring comprising a chamber and a piston and said striker comprising at least one lifting surface, a chain assembly, said chain assembly comprising a plurality of sprockets, said sprockets being operatively coupled to said motor, a chain operatively coupled to said plurality of sprockets, said chain comprising a plurality of lifter links disposed along said chain and said sprockets capable of causing the chain to translate, and a clutch, a gas spring preload means for installing the gas spring in the apparatus, and wherein said gas spring preload means energizes the gas spring slightly during installation in the apparatus by providing a force on the gas spring, wherein when said chain assembly translates, at least one lifter link of said plurality of lifter links engages at least one lifting surface of said striker for a portion of said translation of said chain to increase potential energy in said gas spring and after said chain assembly disengages said spring striker assembly, the potential energy from said gas spring decreases while accelerating the striker to impact said striker cup, wherein an impact force from said striker is transmitted to said striker cup, wherein said chain assembly thereafter again engages said spring striker assembly, and wherein said clutch prevents reverse rotation of the motor when the apparatus is not operating.

2. The apparatus of claim 1, wherein each lifter link of said plurality of lifter links comprises a lifting roller.

3. The apparatus of claim 1, wherein at least a portion of said at least one lifting surface of said striker inclines toward said striker.

4. The apparatus of claim 1, wherein said gas spring comprises at least one cup seal.

5. The apparatus of claim 1, wherein said gas spring preload means is one of an extended thread, a camming mechanism, a mechanical mechanism and a toggle clamp.

6. An impacting apparatus, the apparatus comprising:

a power source, a control circuit, a motor, said motor capable of rotational motion, a striker cup, a spring striker assembly, said spring striker assembly comprising a gas spring and a striker, said gas spring comprising a chamber and a piston and said striker comprising at least one lifting surface, a chain assembly, said chain assembly comprising a plurality of sprockets, said sprockets being operatively coupled to said motor, a chain operatively coupled to said plurality of sprockets, said chain comprising a plurality of lifter links disposed along said chain and said sprockets capable of causing the chain to translate, and a gas spring preload means for installing the gas spring in the apparatus, and a sensor, said sensor being operatively coupled to said control circuit and capable of determining the location of at least one of said striker and said striker cup, wherein said gas spring preload means energizes the gas spring slightly during installation in the apparatus by providing a force on the gas spring, wherein when said chain assembly translates, at least one lifter link of said plurality of lifter links engages at least one lifting surface of said striker for a portion of said translation of said chain to increase potential energy in said gas spring and after said chain assembly disengages said spring striker assembly, the potential energy from said gas spring decreases while accelerating the striker to impact said striker cup, wherein an impact force of said striker is transmitted to said striker cup, wherein said sensor causes said motor to cease operation after said sensor detects that said striker has reached a location.

7. The apparatus of claim 6, wherein each lifter link of said plurality of lifter links comprises a lifting roller for facilitating disengagement of said chain assembly from said spring striker assembly.

8. The apparatus of claim 6, wherein at least a portion of said least one lifting surface of said striker inclines toward said striker.

9. The apparatus of claim 6, wherein said gas spring comprises at least one cup seal.

10. The apparatus of claim 6, wherein said gas spring preload means is one of an extended thread, a camming mechanism, a mechanical mechanism and a toggle clamp.

11. An impacting apparatus, the apparatus comprising:

a power source, a control circuit, a motor, said motor capable of rotational motion, a striker cup, a spring striker assembly, said spring striker assembly comprising a gas spring and a striker, said gas spring comprising a chamber and a piston and said striker comprising at least one lifting surface, a chain assembly, said chain assembly comprising a plurality of sprockets, said sprockets being operatively coupled to said motor, a chain operatively coupled to said plurality of sprockets, said chain comprising a plurality of lifter links disposed along said chain and said sprockets capable of causing the chain to translate, a gas spring preload means for installing the gas spring in the apparatus, wherein said gas spring preload means energizes the gas spring slightly during installation in the apparatus by providing a force on the gas spring, wherein when said chain assembly translates, at least one lifter link of said plurality of lifter links engages at least one lifting surface of said striker for a portion of said translation of said chain to increase potential energy in said gas spring and after said chain assembly disengages said spring striker assembly, the potential energy from said gas spring decreases while accelerating the striker to impact said striker cup, wherein an impact force from said striker is transmitted to said striker cup.

12. The apparatus of claim 11, wherein each lifter link of said plurality of lifter links comprises a lifting roller.

13. The apparatus of claim 11, wherein at least a portion of said at least one lifting surface of said striker inclines toward said striker.

14. The apparatus of claim 11, wherein said apparatus further comprises a gas spring mount and wherein said gas spring mount comprises at least one degree of freedom.

15. The apparatus of claim 11, wherein said apparatus comprises a threaded region and said gas spring comprises a threaded member for engagement with said threaded region.

16. The apparatus of claim 11, wherein said gas spring preload means is one of an extended thread, a camming mechanism, a mechanical mechanism and a toggle clamp.

17. The apparatus of claim 11, wherein said apparatus further comprises a handle that is operatively coupled to said control circuit and wherein movement of said handle in the direction of the force of impact initiates rotation of said motor and a lack of pressure on said handle terminates rotation of said motor.

* * * * *